United States Patent
Crouch et al.

(10) Patent No.: US 11,626,023 B2
(45) Date of Patent: Apr. 11, 2023

(54) SYSTEMS AND METHODS FOR EDITING AND DISPLAYING WAYPOINT CONSTRAINTS AND CONDITIONS

(71) Applicant: HONEYWELL INTERNATIONAL INC., Charlotte, NC (US)

(72) Inventors: Steven C. Crouch, Mesa, AZ (US); Ratan Khatwa, Redmond, WA (US); Santosh Mathan, Redmond, WA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/205,901

(22) Filed: Mar. 18, 2021

(65) Prior Publication Data

US 2022/0301443 A1 Sep. 22, 2022

(51) Int. Cl.
*G08G 5/00* (2006.01)
*G06F 3/04817* (2022.01)
*G06F 3/0482* (2013.01)

(52) U.S. Cl.
CPC ......... *G08G 5/0021* (2013.01); *G06F 3/0482* (2013.01); *G06F 3/04817* (2013.01); *G08G 5/003* (2013.01); *G08G 5/006* (2013.01); *G08G 5/0013* (2013.01)

(58) Field of Classification Search
CPC ... G06F 3/0417; G06F 3/0482; G08G 5/0021; G08G 5/0013; G08G 5/003; G08G 5/006
See application file for complete search history.

(56) References Cited

U.S. PATENT DOCUMENTS

| | | | |
|---|---|---|---|
| 8,380,366 B1 * | 2/2013 | Schulte | G01C 23/00 701/25 |
| 8,843,306 B1 | 9/2014 | Spackman et al. | |
| 9,710,145 B2 | 7/2017 | Zammit-Mangion et al. | |
| 10,692,387 B2 | 6/2020 | Zhang et al. | |

(Continued)

FOREIGN PATENT DOCUMENTS

| | | |
|---|---|---|
| CN | 104457739 A | 3/2015 |
| EP | 2136276 A2 | 12/2009 |
| WO | 2018/053742 A1 | 3/2018 |

*Primary Examiner* — Seth A Silverman
(74) *Attorney, Agent, or Firm* — Lorenz & Kopf, LLP

(57) ABSTRACT

Aircraft display systems and methods. Flight data is received from a Flight Management System (FMS) or other flight data source. A map display is generated based on the flight data including a depiction of a flight path and a plurality of waypoints or other fixes. A user selection of one of the waypoints or other fixes is received. An edit dialog box is generated. A value for a constraint or condition for the selected one of the waypoints or fixes is entered in the edit dialog box display by the user via a user interface device. The value for the constraint or condition is applied to the selected one of the waypoints or fixes via the FMS or other flight data source. The map display is generated including the depiction of the flight path and the plurality of waypoints or fixes. An icon is tagged to the selected one of the waypoints or fixes. The icon denotes an existence of the constraint or condition and a type of the constraint or condition. A constraint or condition dialog box is generated providing further information on the constraint or condition, in response to the user selecting the icon using the user interface device.

16 Claims, 14 Drawing Sheets

(56) References Cited

U.S. PATENT DOCUMENTS

| | | | |
|---|---|---|---|
| 11,041,737 B2* | 6/2021 | Peng ................... | G08G 5/0034 |
| 2009/0248224 A1* | 10/2009 | Tschannen ............. | G01C 23/00 |
| | | | 701/3 |
| 2015/0356873 A1* | 12/2015 | Kneuper ............... | G06T 11/206 |
| | | | 701/439 |
| 2020/0168104 A1* | 5/2020 | Holder .................. | B64D 45/00 |
| 2020/0168107 A1* | 5/2020 | Heine ................... | G01C 23/00 |

\* cited by examiner

No Hold Constraint Applied

Hold Constraint Applied

Hold Constraint Applied;
Aircraft is "On Target"

RTA Constraint Applied;
Aircraft is "Off Target"

No Cross Constraint Applied

Cross Constraint Applied

Cross Constraint Applied;
Aircraft is "On Target"

Cross Constraint Applied;
Aircraft is "Off Target"

No Speed Constraint Applied

Speed Constraint Applied

246 SPEED CONSTRAINT ENUMERATION

248 SPEED CONSTRAINT LESS THAN, GREATER THAN OR EQUAL TO INDICATOR

Speed Constraint Applied; Aircraft is "On Target"

Speed Constraint Applied; Aircraft is "Off Target"

No Proc Turn Constraint Applied

Proc Turn Constraint Applied

**Proc Turn Constraint Applied;
Aircraft is "On Target"**

**Proc Turn Constraint Applied;
Aircraft is "Off Target"**

SYSTEMS AND METHODS FOR EDITING AND DISPLAYING WAYPOINT CONSTRAINTS AND CONDITIONS

TECHNICAL FIELD

The present disclosure generally relates to systems and methods for editing and displaying waypoint constraints and conditions. More particularly, the present disclosure relates to map displays and the editing and displaying of waypoints and conditions within the map display.

BACKGROUND

Modern aircraft navigation displays provide the means to specify and monitor lateral and vertical aircraft profiles using waypoint annotations, and waypoint lists. These display elements not only show spatial locations that will be traversed by an aircraft, but also synthesize crossing constraints or other conditions associated with them.

As a flight progresses, these waypoint lists and waypoint data blocks provide a way for pilots to assess progress relative to an explicitly specified flight plan. When a pilot observes or predicts a discrepancy between aircraft performance and the established plan, the pilot can access a variety of automation and control functions to either modify constraints or manage aircraft trajectory to conform to specified parameters. Unfortunately, many of the functions necessary to adjust these parameters are distributed across the system—imposing workload and introducing the potential for errors of commission and omission when making changes. There is a cost associated with both learnability and training for such UI designs. For example, in current cockpit avionics systems, the flight crew must access important waypoint constraints through a series of menus and dialog windows. Flight Crew can access Vectors, Hold, Cross, and Required Time of Arrival (RTA) dialog windows on a specific waypoint. After constraints are added via one or more of these dialog windows, the flight crew must continually access the dialog windows in the same manner to make changes and/or provide information cues or updates regarding a constraint.

Hence, it is desirable to provide systems and methods for setting, editing and accessing status information for a constraint or condition associated with a waypoint or other fix that reduces pilot workload. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In aspects of the present disclosure, there are disclosed aircraft display systems and methods. Flight data is received from a Flight Management System (FMS) or other flight data source. A map display is generated based on the flight data including a depiction of a flight path and a plurality of waypoints or other fixes. A user selection of one of the waypoints or other fixes is received. An edit dialog box is generated. A value for a constraint or condition for the selected one of the waypoints or fixes is entered in the edit dialog box display by the user via a user interface device. The value for the constraint or condition is applied to the selected one of the waypoints or fixes via the FMS or other flight data source. The map display is generated including the depiction of the flight path and the plurality of waypoints or fixes. An icon is tagged to the selected one of the waypoints or fixes. The icon denotes an existence of the constraint or condition and a type of the constraint or condition. A constraint or condition dialog box is generated providing further information on the constraint or condition, in response to the user selecting the icon using the user interface device.

Furthermore, other desirable features and characteristics will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
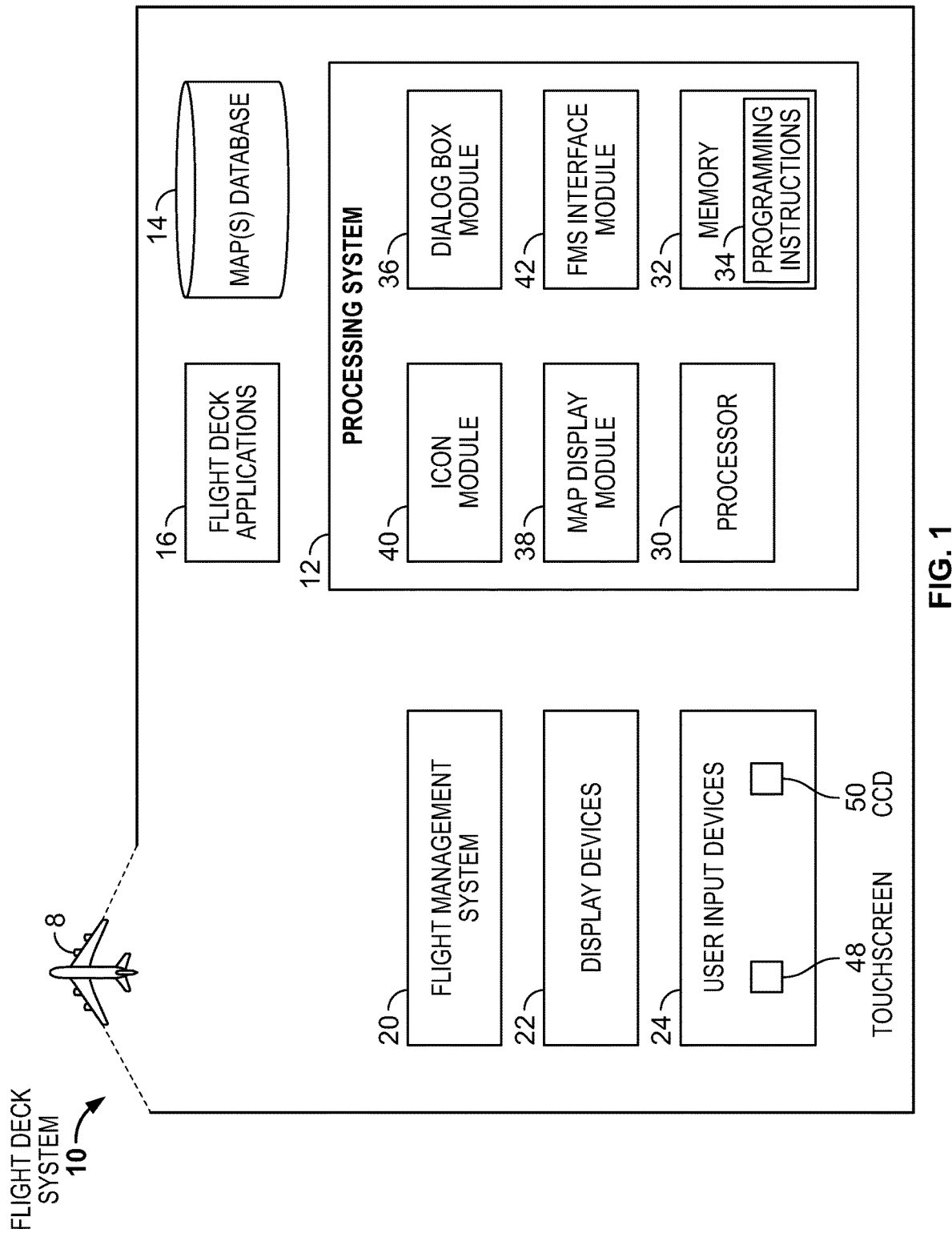
FIG. 1 depicts a flight deck system, in accordance with an embodiment of the present disclosure.

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

The present disclosure provides systems and methods including contextually linked direct access to automation functionality. In one example, a constraint or condition can be set for a waypoint/fix by invoking a constraint/condition specific dialog box. An icon is generated including information concerning the set constraint/condition. The icon is tagged to the waypoint/fix. The icon links back to the constraint/condition specific dialog box to allow viewing detailed information and providing quick access to editing the set constraint/condition. Thus, the links invoke dialog boxes relevant to achieve constraints or conditions displayed on navigation displays by means of a single pilot action. In an example, the constraint/condition is Required Time of Arrival (RTA) constraints and the speed management functions necessary to achieve them. Once a constraint is active on a given waypoint, the icon includes contextual symbology conveying specific meaning via color and/or flight-specific data to provide additional information and situational awareness to the flight crew.

In embodiments, the systems and methods allow the crew to quickly, efficiently, and directly manipulate navigational constraints/conditions with a single click or finger press on a waypoint/fix to reduce cognitive load while also reducing the effort required to perform tasks; allowing the crew to focus on more cognitive-intensive tasks which require more focus. The systems and methods greatly simplify common tasks associated with waypoint operations that are performed throughout the flight. The information and controls required to perform tasks associated with aircraft navigation are consequently consolidated and local to the waypoint of interest on the navigation display—instead of the pilot having to memorize and perform a sequence of actions via menus and dialogs to arrive at controls performing the same waypoint operations.

In one exemplary pilot workflow, an RTA constraint is invoked directly on a waypoint by loading a constraint specific dialog box and then the constraint specific dialog box is opened to make edits by clicking on a created icon tagged to the waypoint. The pilot is provided visual indications as to the RTA constraint status in the icon and in the constraint specific dialog box. Assuming that no constraint is active on a waypoint, the pilot accesses contextual menu dialog box on the waypoint and selects "RTA". An RTA dialog box/window is opened and the Pilot selects an "Edit RTA" button. In the edit dialog box, the pilot selects desired constraints and clicks an "Apply" button. The RTA constraint is applied to the waypoint with an icon to denote the constraint. The pilot can click directly on the RTA constraint icon to directly access the RTA dialog box/window to make edits or to remove the constraint. In addition to the RTA constraint, various other constraints/conditions/operations may be applied to a particular waypoint or fix; such as holding pattern, procedure turn, altitude constraint, crossing waypoint constraint (including speed and/or altitude constraints), a speed constraint, etc.

The icon may provide unique visual symbology to denote that a waypoint has a set constraint/condition as well as color coding or other information to denote the current status of the aircraft with respect to meeting the applied constraint. The icon may include unique symbology to denote the type of constraint that has been applied to the waypoint. A waypoint may also contain multiple constraints/conditions. In such cases, a series of icons is displayed with respective color-coding illustrating the current status of the specific constraint/condition of each icon.

FIG. 1 illustrates a flight deck system 10 including various display generation and constraint/condition input, depiction and execution feature, in accordance with exemplary embodiments. The system 10 is included at least partly in an aircraft 8. System 10 includes, inter alia, a processing system 12, a map(s) database 14, flight deck applications 16, display devices 22, user input devices 24 and a flight management system (FMS) 20 in a flight deck of an aircraft. System 10 allows a flight crew member to set a constraint/condition for a waypoint/fix, which causes an icon to be created providing information concerning the constraint/condition and including a one-click/one-tap link to a constraint/condition specific dialog box to display further information on the constraint/condition and including an edit selector button invoking an edit dialog box allowing the constraint/condition to be redefined.

The system 10 includes a processing system 12 including a processor 30, memory 32, dialog box module 36, map display module 38, icon module 40 and FMS interface module 42. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality. In an embodiment, the various modules are implemented by way of computer programming instructions 34 stored on memory 32 and executed by the processor 30. The memory 32 can include one or more computer-readable media, including, but not limited to, non-transitory computer-readable media, RAM, ROM, hard drives, flash drives, or other memory devices.

In embodiments, the map display module 38 accesses the map database 14, FMS data from the FMS 20 and other data sources (such as a traffic information source, an airport information source, weather information source(s), etc.) to generate a graphical user interface 201 including one or more maps as exemplified in FIG. 2. The FMS data includes a flight plan defining waypoints/fixes through which the aircraft 8 is planned to fly from take-off to destination. In alternative embodiments, another source of flight data could be provided. In one example, the flight information is off-board and is down-linked to the aircraft. The map database 14 provides geographical map data and optionally additional map layers such as terrain data. The FMS 20 may include a navigation system and a guidance system. An FMS 20, as is generally known, is configured to perform a wide variety of in-flight tasks during operation of an aircraft. These tasks include aircraft navigation and guidance. Although not specifically shown, the FMS 20 may additionally include a database with any elements necessary for the operation of the aircraft and the creation and implementation of a flight plan, including waypoints, airports, terrain information and applicable flight rules. Generally, the FMS 20 functions to support navigation, flight planning, and other aircraft control functions, as well as provide real-time data and/or information regarding the operational status of the aircraft. The FMS 20 may include or otherwise access one or more flight deck applications 16 including a weather system, an air traffic management system, a radar system, a traffic avoidance system, an autopilot system, a flight control system, crew alerting systems, electronic checklist systems, an electronic flight bag, and/or other suitable avionics systems.

Figure 2A:
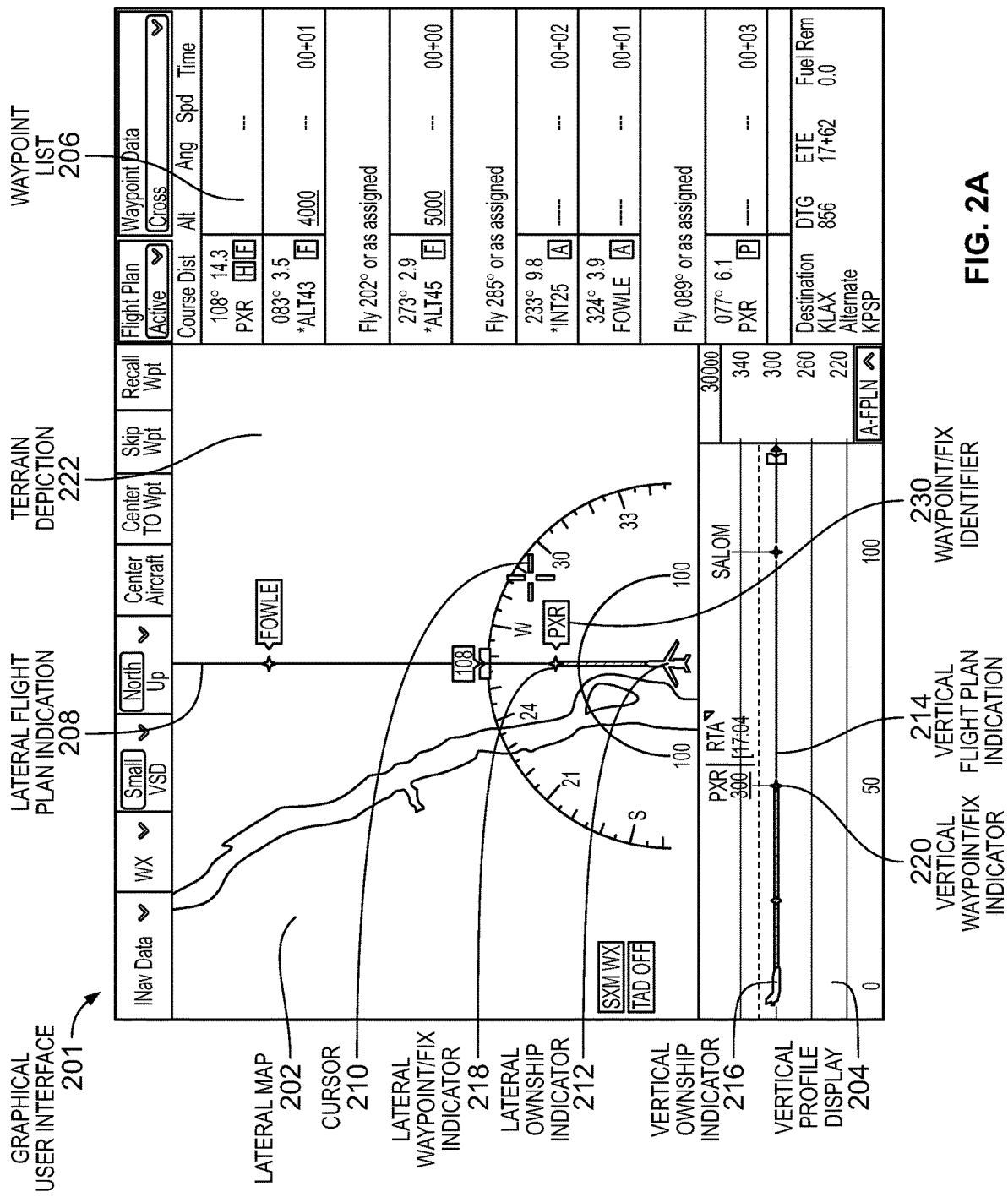
FIGS. 2A to 2F depict a sequence of graphical user interfaces for an aircraft when setting and editing a constraint or condition for a selected waypoint/fix, in accordance with an embodiment of the present disclosure.
Figure 2B:
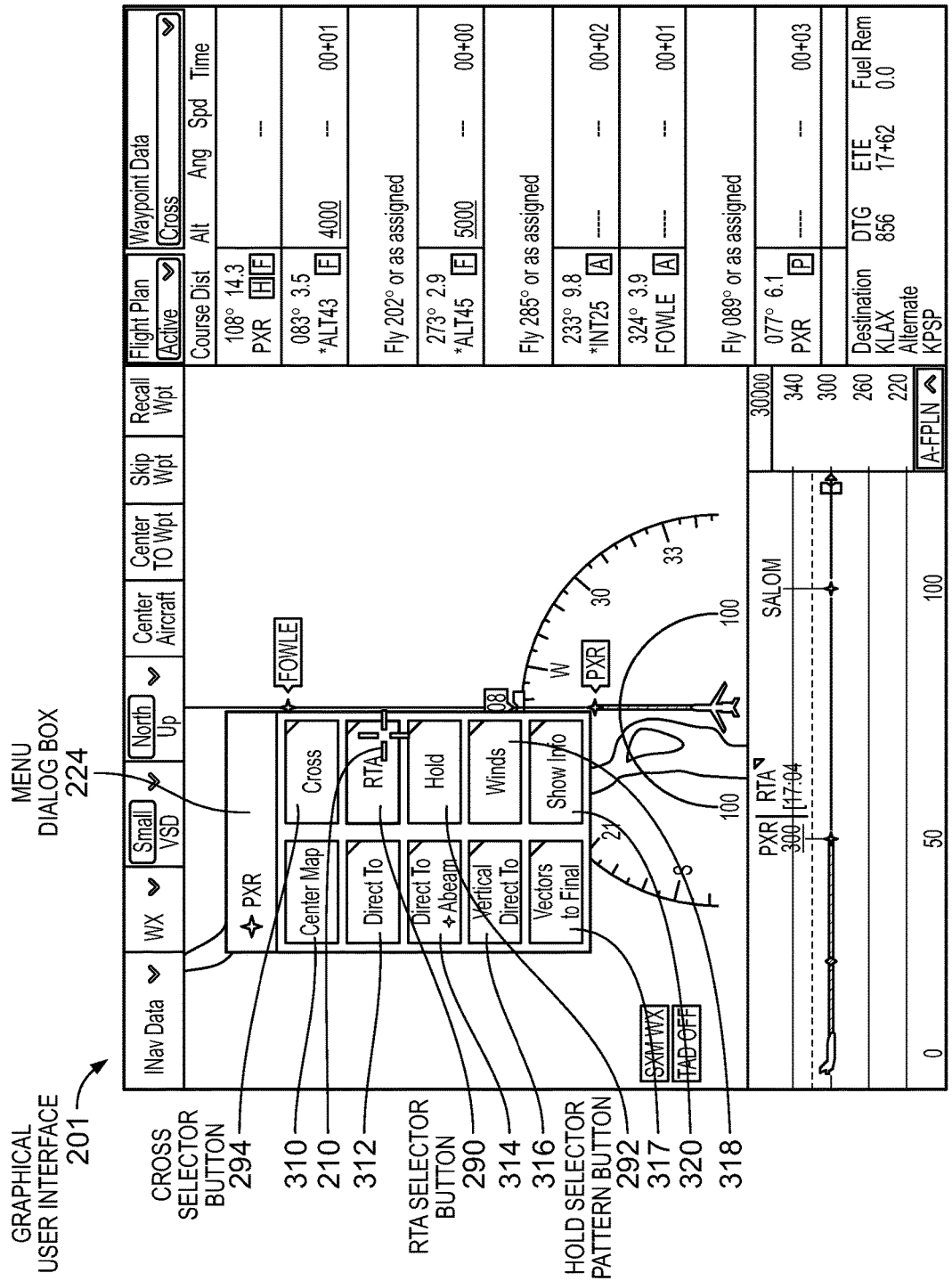

In embodiments, the dialog box module 36 generates a menu dialog box 224 as exemplified in FIG. 2B when a waypoint/fix is selected by a user through the user input device 24. The menu dialog box 224 provides a number of selection buttons including buttons for inputting a constraint/condition associated with the selected waypoint/fix. When a constraint/condition button is selected, a constraint/condition specific dialog box 228 is opened as exemplified in FIG. 2C. The constraint/condition specific dialog box 228 provides options for setting/editing the constraint/condition. An edit/set dialog box 260 is generated to allow a user to enter values for constraints/conditions and to apply those values. The dialog box module 36 controls generation of the dialog boxes 224, 228, 260, receipt of user data entry to the dialog boxes 224, 228, 260 and output of control information to other modules/applications for responsive actions to the input constraints and conditions.

In embodiments, the icon module 40 creates and maintains one or more icons 226 representing the constraint/condition. The icons 226 provide a shortcut to the constraint/condition specific dialog box 228, as exemplified in FIG. 2E. The icon 226 is provided in the form of a flag icon hanging from the waypoint/fix associated with the constraint/condition in a map part of the graphical user interface 201. The icon 226 includes static data such as an indication of the type of constraint/condition that has been set and live data such as an indication of the current status of the constraint/condition with respect to whether the aircraft 8 is on target or off target with respect to achieving or meeting the constraint/condition.

In embodiments, the FMS interface module 42 receives and sends data items from/to the FMS 20 that are required by the other modules 36, 38, 40 described above. For example, the FMS interface module 42 receives FMS data from the FMS 20 for the icon module 40 to provide live status information and for the dialog box module 36 to provide live status information in the constraint/condition specific dialog box 228. Furthermore, the FMS interface module 42 can provide data representing any set constraints/conditions to the FMS 20 so that the FMS 20 can execute, or aim to execute, the constraint/condition in conjunction with the autopilot system and/or the flight control system of the flight deck applications 16 such that the aircraft 8 flies, or aims to fly, in compliance with the set constraint/condition.

The system 10 includes one or more display devices 22 including a navigation display, a primary flight display, an electronic flight bag (EFB), and/or instrument panels. The displays are operable to present the graphical user interface 201 exemplified in FIGS. 2A to 2F, which includes a lateral profile map and/or a vertical profile map, a depiction of the flight plan including waypoints/fixes and the icon 226 describing any set constraints/conditions for a particular waypoint/fix. The dialog boxes 224, 228, 260 can be presented as overlays on the lateral or vertical profile map in the graphical user interface 201. At least one of the dialog boxes 224, 228, 260 may be integrated into the waypoint list 206. Exemplary graphical user interfaces 201 are described below with respect to the figures.

The system 10 includes user input devices 24 to provide data and command entry modalities. In embodiments, the user input devices 24 include one or more of a keyboard (virtual or physical), joystick, multi-way rocker switches, mouse, trackball, touchscreen 48, touch pad, data entry keys, cursor control device 50 and/or any other suitable device. The user input devices 24 allow the user to enter commands and data into the system 10 so as to interact with the flight deck applications 16 and the FMS 20. The user input devices 24 allow a user to select a waypoint or fix displayed in the graphical user interface 201 and to enter selections and data concerning one or constraints/conditions for the selected waypoint/fix via the dialog boxes 224, 228, 260.

FIG. 2A illustrates an exemplary graphical user interface 201 that is at least partly generated by the map display module 38. The graphical user interface 201 includes a lateral map 202, a vertical profile display 204 and a waypoints list 206. It should be appreciated that a given user may have display settings such that the vertical profile display 204 or the waypoints list 206 are hidden. The lateral map 202 includes a lateral flight plan indication 208, which includes a plurality of lateral waypoint/fix indicators 218. The lateral waypoints/fix indicators 218 are graphical crosses or stars in the present embodiment. A waypoint/fix identifier 230 is tagged to each lateral waypoint/fix indicator 218 to label the lateral waypoint/fix indicator 218 including alphanumeric text (PXR and FOWLE in the present embodiment) representing the geographic location of the waypoint/fix, usually in an abbreviated way. The lateral flight plan indication 208 includes a line connecting each lateral waypoint/fix indicator 218. The lateral flight plan indication 208 is overlaid on the lateral map 202, which is generated based on map data from the map database 14. In the present embodiment, the map data includes terrain data such that a terrain depiction 222 is provided in the lateral map 202. Other map layers are possible including buildings, roads, traffic, airport detailed information, etc. The lateral map 202 includes a lateral ownship indicator 212 depicting a current position of the aircraft 8. In some embodiments, a cursor 210 is provided to allow selection of some graphical elements such as the lateral waypoint/fix indicators 218 and the icons 226. The vertical profile display 204 includes similar graphical elements including a vertical ownship indicator 216 and a vertical flight plan indication 214 including vertical waypoint/fix indicators 220 and associated icons 226. In the example of FIG. 2A, the graphical user interface 201 includes the waypoints list 206 providing more detailed alphanumeric information on upcoming waypoints.

In FIG. 2B, the graphical user interface 201 is shown after a user has called a menu dialog box 224 by selection on a lateral or vertical waypoint/fix indicator 218, 220 with the user input device 24 (e.g. by selection with the cursor control device 50 or by touchscreen 48 touch selection). The menu dialog box includes a plurality of buttons allowing a user to set a constraint or condition for the selected waypoint/fix, to input a flight operation for the selected waypoint/fix or to retrieve waypoint/fix specific information. The options in the menu dialog box 224 apply to the selected waypoint/fix.

In the example shown in FIG. 2A, the user has selected the PXR waypoint/fix and the menu dialog box 224 is for setting a constraint or condition for the PXR waypoint/fix. The menu dialog box 224 appears as an overlay next to the selected waypoint/fix. The plurality of buttons includes a Center Map button 310 to center the lateral map 202 on the selected waypoint/fix. The plurality of buttons includes a Direct To button 312 to instigate a command, executed via the FMS 20, to fly directly to the selected waypoint/fix. The plurality of buttons includes a Direct To Abeam button 314, which instigates a command, executed via the FMS 20, to include a plurality of in-between waypoints between the current location of the aircraft 8 and the selected waypoint/fix. The Vertical Direct To button 316 allows a user to enter altitude criteria, within operational constraints of the aircraft 8, to which the aircraft 8 should ascend or descend by the selected waypoint/fix and to travel to the selected waypoint/fix directly. A constraint/condition specific dialog box 228 will be opened in response to selecting the Vertical Direct To button 316, as will be described in the following with respect to FIG. 2C. The Vectors to Final button 317 allows the selected waypoint/fix to be elected as the final waypoint/fix in an instrument approach and causes the aircraft 8 to be vectored to the selected waypoint/fix, which will be executed via the FMS 20. The Cross selector button 294 allows a user to set altitude and/or speed constraints including at, above, below or between constraints to be set for the selected waypoint/fix. In response to selection of the Cross selector button 294, a constraint/condition specific dialog box 228 is opened to replace the menu dialog box 224, as will be described with respect to FIG. 2C. The plurality of buttons includes an RTA selector button 290 that can be selected by a user to input a required time of arrival constraint for the selected waypoint/fix. In response to selection of the RTA selector button 290, a constraint/condition specific dialog box 228 is opened, as will be described with respect to FIG. 2C. The plurality of buttons includes a holding pattern selector button 292 allowing a user to select a holding pattern around the selected waypoint/fix. Activation of the holding pattern selector button 292 will cause a constraint/condition specific dialog box 228 to be opened, as will be described with respect to FIG. 2C. The plurality of buttons includes a Winds button that provides wind information for the selected waypoint/fix when the button is picked by the user. The Show Info button provides further information on the selected waypoint/fix when the button is activated by the user.

Figure 2C:
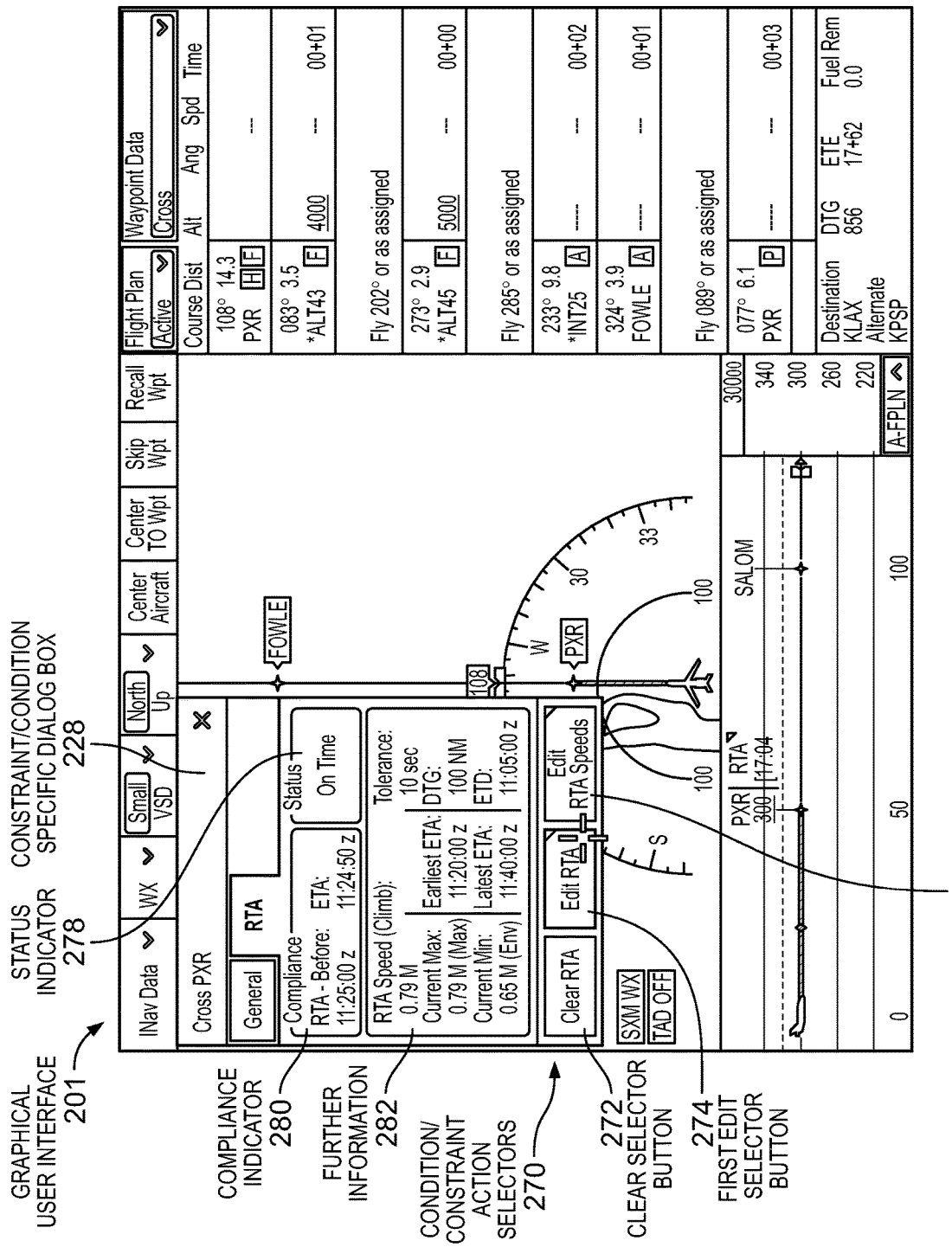

Referring to FIG. 2C, a constraint/condition specific dialog box 228 is illustrated according to one example embodiment. In this example, the constraint/condition is an RTA constraint in response to the RTA selector button 290 being selected using the cursor 210 in the menu dialog box 224. As such, the constraint/condition specific dialog box 228 provides information concerning an RTA constraint in the constraint/condition specific dialog box 228. For other constraints/conditions like holding pattern, crossing constraint, Direct To and Vertical Direct To, other constraint specific information will be included in the dialog box 228. The constraint/condition specific dialog box 228 includes a plurality of buttons. The plurality of buttons includes a clear selector button 272 for clearing or removing a previously set constraint/condition (e.g. an RTA constraint in this case). The plurality of buttons includes a first edit selector button 274 allowing for values of the constraint/condition to be input (as edits to a pre-existing setting or as a new constraint/condition) to an edit/set dialog box 260 that will be described with respect to FIG. 2D. The plurality of buttons (shown as condition/constraint action selectors 270) may include a second edit selector button 275 that allows for a subset of the values of the constraint/condition to be input (as edits or new values). In the present case, RTA speeds can be input by pressing the second edit selector button 275 wherein the speeds are a subset of speeds and time of arrival entries that can be made by selecting the first edit selector button 274. The provision of a plurality of edit selector buttons 274, 275 is an optional feature and just one such button may be provided in a consolidated embodiment.

In the example of FIG. 2C, an RTA constraint has already been set. In this case, the constraint/condition specific dialog box 228 shows information on the pending RTA constraint. The information includes a compliance indicator 280 showing the set target RTA (e.g. RTA before 11:25:00) and the Expected Time of Arrival (ETA: 11:24:50). The ETA value is extracted from values output by the FMS 20. The constraint/condition specific dialog box 228 includes further information 282 relating to the RTA constraint including RTA speed, earliest ETA and latest ETA as calculated by the FMS 20. It will be appreciated that each specific type of constraint/condition will include its own metrics for the compliance indicator 280 and the further information 282. For example, altitude constraints (e.g. crossing constraints or vertical direct to constraints) will have altitude related metrics detailing the set constraints and the current performance with respect to achieving the constraint. The constraint/condition specific dialog box 228 further includes a status indicator 278 providing a simple indication of whether the set constraint is being achieved or met (e.g. On Target or On Time) as contrasted to the numerical evaluation in the compliance indicator 280.

In cases when a constraint/condition has not yet been set, the constraint/condition specific dialog box 228 can have blank values in the status indicator 278, the compliance indicator 280 and the further information 282 and the condition/constraint action selectors 270 can include New or Set buttons rather than edit buttons 274, 275.

Figure 2D:
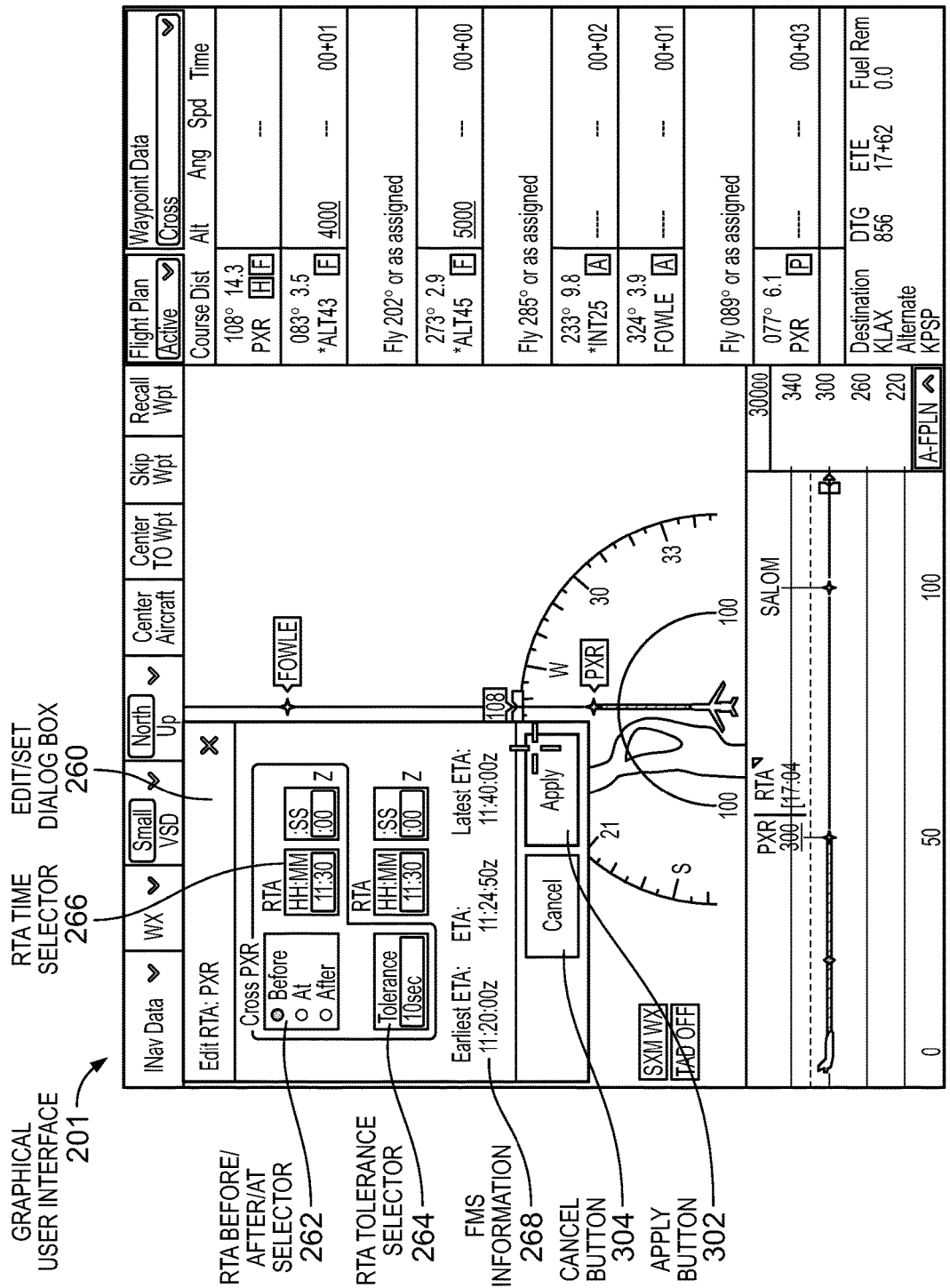

Referring to the exemplary embodiment of FIG. 2D, the edit/set dialog box 260 is opened in response to a user selecting the first edit selector button 274 or a new constraint/condition setting button using the user input device 24. The edit/select dialog box is constraint/condition specific. In the case of a crossing constraint, speed or altitude values may be input along with before, at, after or between type values being selected so that the crossing constraint for the selected waypoint/fix can be submitted to the FMS 20. In the case of a holding pattern condition, preprogrammed holding pattern values (altitude, position, speed, etc.) may be entered or manual entries describing the holding pattern may be entered (altitude, position, speed, etc.). In the case of a speed constraint, a speed value may be entered along with a requirement for the aircraft speed to be less than, greater than, at or between input speed values. In the case of a procedural turn condition, preprogrammed procedural turn values (altitude, position, speed, etc.) may be entered or manual entries describing the procedural turn may be entered (altitude, position, speed, etc.). Altitude or speed and/or time of arrival constraints or procedural operations can be defined in the edit/set dialog box 260 for a specific condition/constraint selected in the menu dialog box and for a specific waypoint/fix selected in the lateral map 202 or the vertical profile display 204.

In the example embodiment of FIG. 2D, an RTA constraint is being edited or set in the edit/set dialog box 260. The edit/set dialog box includes an RTA before/after/at selector 262 allowing selection of whether the aircraft 8 should arrive at the waypoint/fix temporally before, after or at a time entered in the RTA time selector 266. The RTA time selector 266 may allow the time to be entered in hours, minutes and optionally also seconds. An RTA tolerance selector 264 allows a tolerance range to be entered, which in the example of FIG. 2D is set as 10 seconds plus or minus the RTA entered in the RTA time selector 266. The edit/set dialog box may include FMS information 268 indicating minimum and maximum ETAs based on operational capabilities of the aircraft 8 and an expected ETA based on a current prediction from the FMS 20. The edit/set dialog box 260 includes an apply button 302 such that the entered values for the constraint/condition (irrespective of the constraint/condition type) are submitted to the FMS 20 for execution. Further, a cancel button 304 may be included to cancel any entries made and abort the process.

Figure 2E:
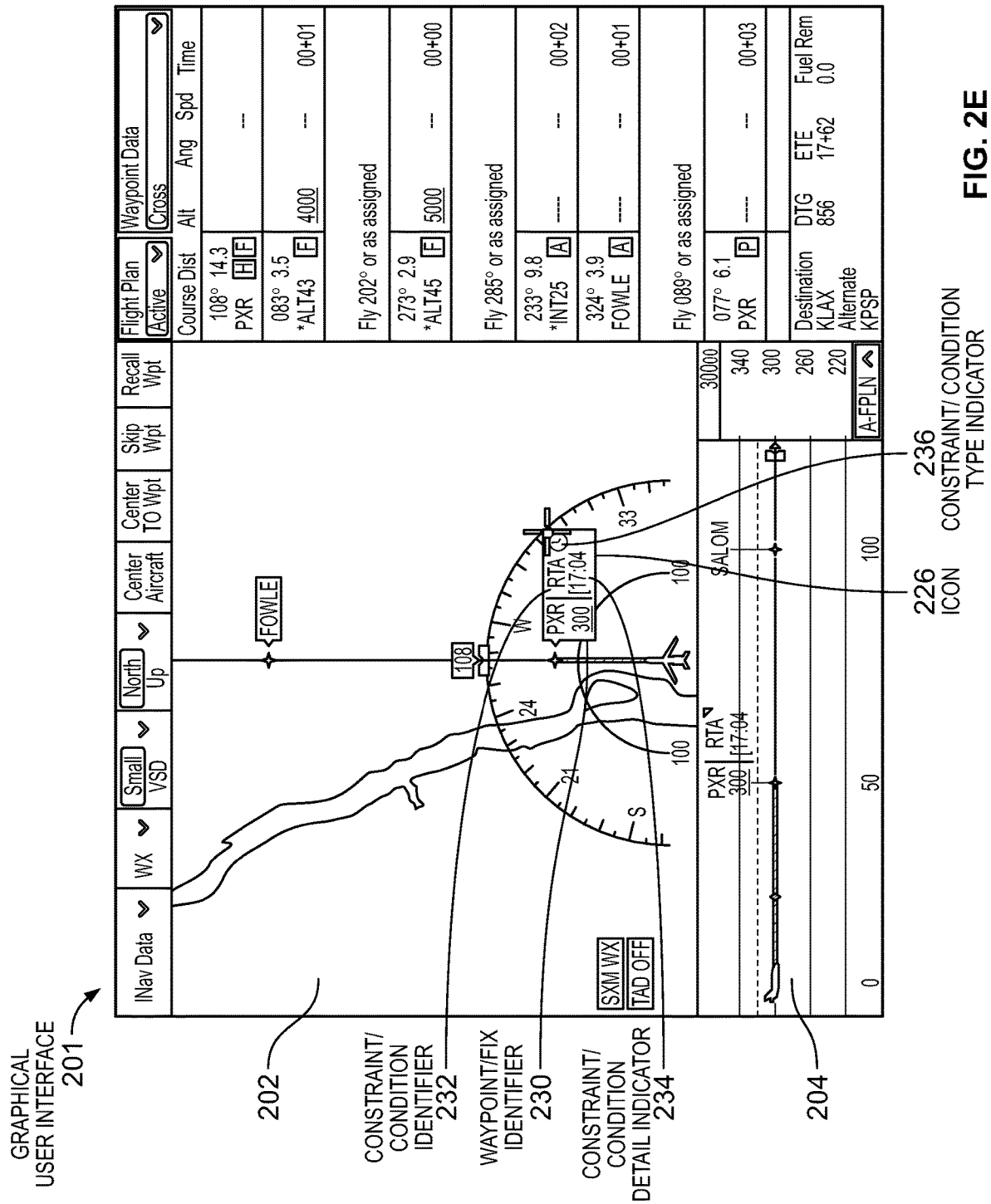

In the example of FIG. 2E, the constraint/condition entered into the edit/set dialog box 260 has been applied by the apply button 302 and submitted to the FMS 20. In response to the submission of the constraint/condition, the icon module 40 generates an icon 226 that at least partly describes the constraint/condition. The icon 226 is connected to the waypoint/fix identifier 230 for the waypoint to which the constraint/condition has been applied. The icon 226 is included in the lateral map 202 and/or the vertical profile display 204. The icon 226 identifies, in connection with the waypoint/fix identifier 230, that a constraint/condition has been applied, the type of constraint/condition (e.g. a procedural turn, a holding pattern, a crossing constraint of any kind (e.g. speed and/or type), an RTA constraint) in a way differentiable from other types of constraint/condition, a numerical value of the constraint/condition where applicable (e.g. time, speed or altitude) and a type of the value (e.g. before, after, at, less than, greater than or between). In the RTA constraint example of FIG. 2D, the icon 226 includes a constraint/condition identifier 232 including alphanumeric text specifying RTA as the constraint. Further, the constraint/condition detail indicator 234 is included in the icon 226 to specify the time value of the RTA constraint of 17:04 and a location of a square bracket relative to the time value indicates the value type, namely left side bracket ('[') means before, right side bracket (']') means after and brackets ('[ ]') on each side means at. Other symbols could be used to indicate the value type of before, after or at. The icon 226 includes a constraint/condition type indicator 236 that can be one of a variety of symbols to indicate the type of constraint/condition. In the present case, the symbol is a clock to indicate an RTA constraint. The constraint/condition type indicator 236 may be color coded based on the status of the constraint/condition according to data provided by the FMS 20. Specifically, different colors can be used depending on whether the aircraft 8 is on target or off target with respect to the constraint/condition.

Figure 2F:
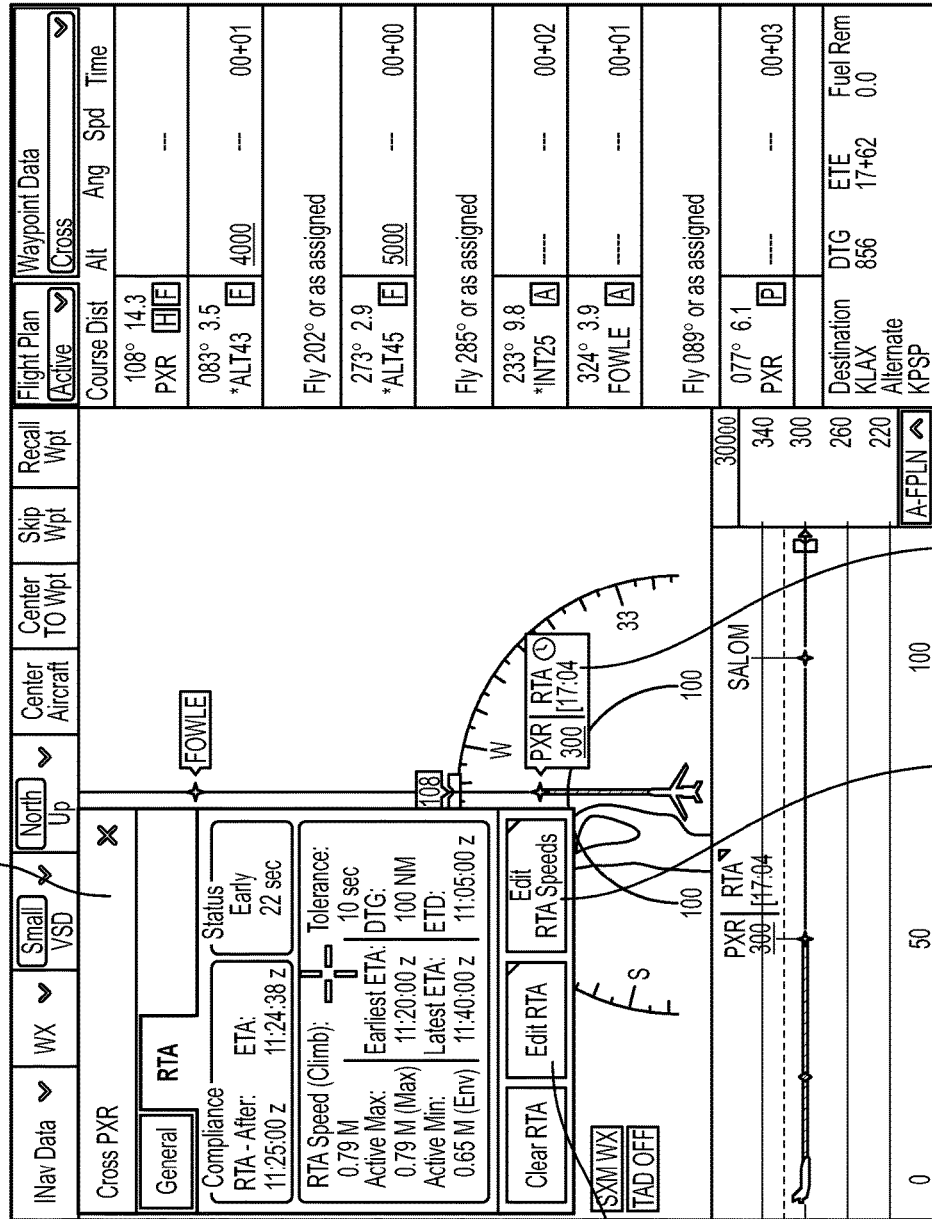

In accordance with embodiments of the present disclosure, the icon 226 embodies a shortcut such that when the icon 226 is selected, the constraint/condition specific dialog box 228 is opened directly without having to re-select the waypoint/fix indicator 218, 220 and to make selections in the menu dialog box 224, as illustrated in FIG. 2F. In this way, the detailed information concerning the constraint/condition embodied by the icon 226 (which resulted in the icon 226 being created) is displayed by the constraint/condition specific dialog box 228. Further, an option to edit the constraint/condition by selecting the edit button 274, 275 is presented to the user.

Figure 3A:
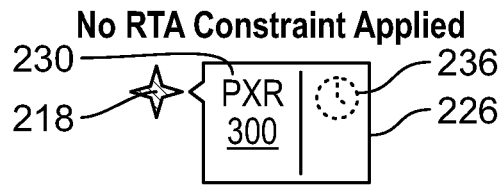
FIGS. 3A to 3E depict icons providing information concerning a constraint or condition associated with a waypoint/fix, in accordance with an embodiment of the present disclosure.
Figure 3B:
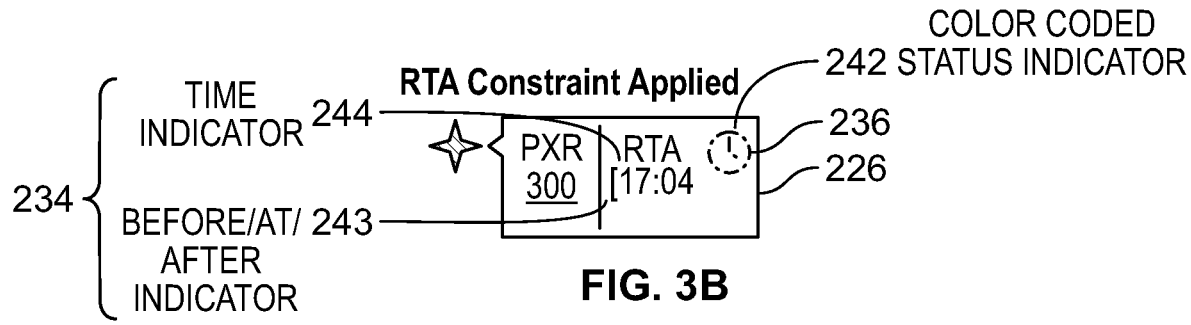
Figure 3C:
Figure 3D:
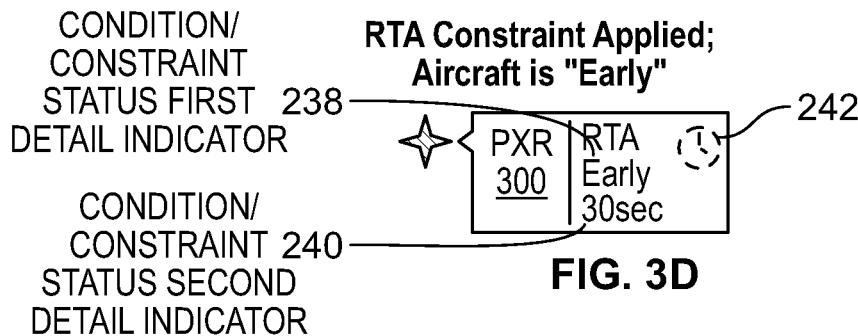
Figure 3E:
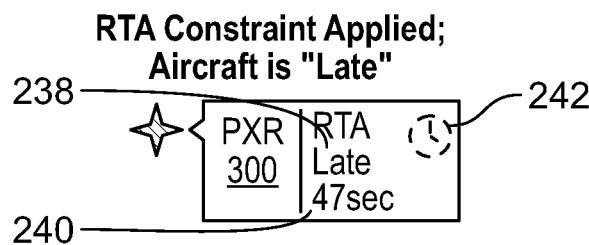

Exemplary icons 226 for the RTA constraint in different situations are provided in FIGS. 3A to 3E. In FIG. 3A, the icon 226 shows that an RTA constraint has been at least partly set up but has not yet been applied by submission to the FMS 20. In this instance, the constraint/condition type indicator 236 (which is a clock symbol in the present example) is generated and displayed but no time values are displayed. Further, a color coding specific to the status of no constraint having been applied is used to display the constraint/condition type indicator 236 in the form of a color coded status indicator 242. In FIG. 3B, the situation has changed to the RTA constraint having been applied but the current status of the RTA constraint has not yet been established by the FMS 20. The constraint/condition detail indicator 234 is added to the icon 226, which presents the time value of the RTA constraint in a time indicator 244 (17:04) and the type of the time value constraint, namely in the form of a before/at/after indicator 243 indicating a before RTA constraint using '[' in this example. Further, the constraint/condition detail indicator 234 has a different color coding from that of FIG. 3A to convey that the RTA constraint has been applied. In the example of FIG. 3C, the FMS 20 has returned data indicating that the aircraft 8 is on target to arrive at the waypoint/fix in compliance with the RTA constraint. In this case, the constraint/condition detail indicator 234 is color coded to indicate an on-target status in the form of a color coded status indicator 242. In FIGS. 3D and 3E, the color coded status indicator 242 is a yet different color to indicate that the aircraft 8 is not predicted by the FMS 20 to comply with the RTA constraint. Exemplary colors for the color coded status indicator 242 are white for no RTA constraint applied, magenta for an RTA constraint applied, green for RTA constraint applied and compliance therewith is predicted and yellow for lack of compliance with the RTA constraint being predicted. In FIG. 3D, the aircraft 8 is predicted by the FMS 20 to arrive early for an after RTA constraint, which results in a lack of compliance color coded status indicator 242. Further, the icon 226 includes a condition/constraint first status detail indicator in the form of an early message (or other indication of type of lack of compliance) and a condition/constraint second detail status indicator 240 quantifying the lack of compliance (e.g. 30 seconds early). In FIG. 3E, the aircraft 8 is predicted to be late for before RTA constraint, resulting in a lack of compliance color coded status indicator 242, a late message for the condition/constraint first detail indicator 238 and a time quantification of how late the aircraft 8 is predicted to be in the condition/constraint second status detail indicator 240.

Figure 4A:
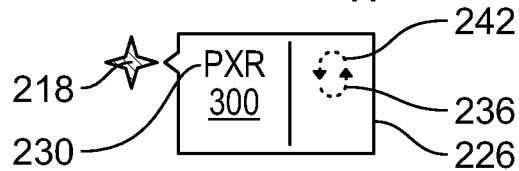
FIGS. 4A to 4D depict icons providing information concerning a constraint or condition associated with a waypoint/fix, in accordance with an embodiment of the present disclosure.
Figure 4B:
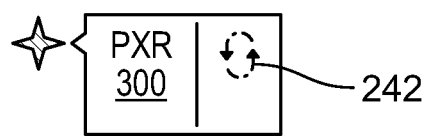
Figure 4C:
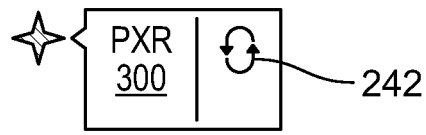
Figure 4D:

In the exemplary embodiment of FIGS. 4A to 4D, the icon 226 is depicted in the case of a hold constraint. In FIG. 4A, a hold constraint has been at least partly input but not yet applied to the FMS 20. The icon 226 includes the constraint/condition type indicator 236 includes a symbol representing a holding pattern. In the example provided, the symbol is a loop with arrows showing a direction (clockwise or anti-clockwise) of the holding pattern. The constraint/condition type indicator 236 is color coded in the form of a color coded status indicator 242 so as to differentiate the following statuses: no hold constraint applied (FIG. 4A), hold constraint applied and no compliance status information yet determined by the FMS 20 (FIG. 4B), hold constraint applied and the aircraft 8 is on target with respect to following the defined holding pattern (FIG. 4C) and hold constraint applied and the aircraft 8 is off target with respect to following the defined holding pattern (FIG. 4D). The respective colors can be white, magenta, green and yellow in one embodiment. It should be appreciated that further details of the off target status could be provided in the icon 226 similar to the first and second detail indicators described with respect to FIGS. 3D and 3E for the RTA constraint. The further details could be provided by the FMS 20 comparing position of the aircraft 8 with the target position of the holding pattern. Not only could an off target or on target message be provided in a condition/constraint status first detail indicator but also a quantification of the off target status (e.g. in distance units) in a condition/constraint status second detail indicator.

Figure 5A:
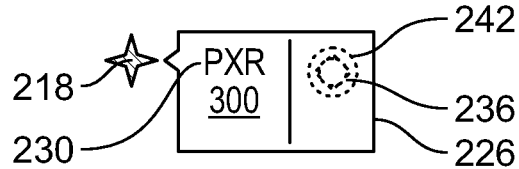
FIGS. 5A to 5D depict icons providing information concerning a constraint or condition associated with a waypoint/fix, in accordance with an embodiment of the present disclosure.
Figure 5B:
Figure 5C:
Figure 5D:
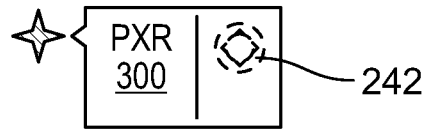

In the exemplary embodiment of FIGS. 5A to 5D, the icon 226 is depicted in the case of a crossing constraint. In FIG. 5A, a crossing constraint has been at least partly input but not yet applied to the FMS 20. The icon 226 includes the constraint/condition type indicator 236 including a symbol representing a crossing constraint. In the example provided, the symbol is an outer circle with a square disposed inside with the corners of the square aligned to compass reference directions North, South, East and West. The constraint/condition type indicator 236 is color coded in the form of a color coded status indicator 242 so as to differentiate the following statuses: no cross constraint applied (FIG. 5A), hold constraint applied and no compliance status information yet determined by the FMS 20 (FIG. 5B), hold constraint applied and the aircraft 8 is on target with respect to complying with the defined crossing constraint (FIG. 5C) and hold constraint applied and the aircraft 8 is off target with respect to following the defined crossing constraint (FIG. 5D). The respective colors can be white, magenta, green and yellow in one embodiment. In FIGS. 5B to 5D, the icon 226 may include a constraint/condition detail indicator annunciating the target speed and/or altitude of the crossing constraint and also whether the crossing constraint is a less than, greater than, at or between value. Not only could an off target or on target message be provided in a condition/constraint status first detail indicator but also a quantification of the off target status (e.g. in altitude or speed units) in a condition/constraint status second detail indicator.

Figure 6A:
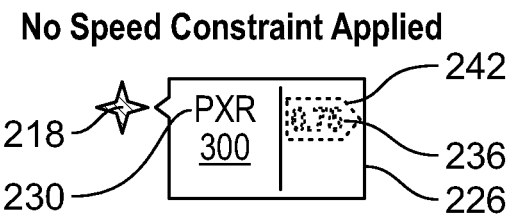
FIGS. 6A to 6D depict icons providing information concerning a constraint or condition associated with a waypoint/fix, in accordance with an embodiment of the present disclosure.
Figure 6B:
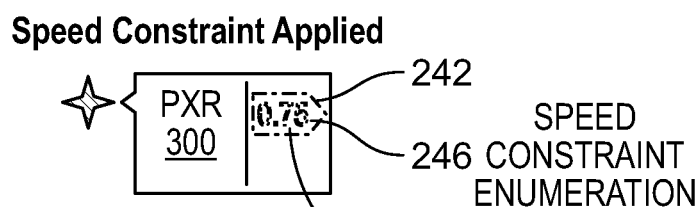
Figure 6C:
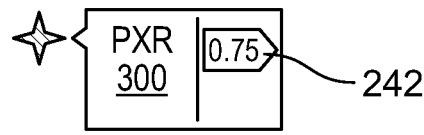
Figure 6D:
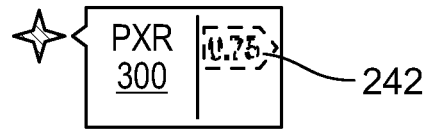

In the exemplary embodiment of FIGS. 6A to 6D, the icon 226 is depicted in the case of a speed constraint. In FIG. 6A, a speed constraint has been at least partly input but not yet applied to the FMS 20. The icon 226 includes the constraint/condition type indicator 236 including a symbol representing a speed constraint. In the example provided, the symbol is an arrow having a speed value disposed therein. A direction of the arrow indicates whether a greater than or less than speed constraint is applied. The constraint/condition type indicator 236 is color coded in the form of a color coded status indicator 242 so as to differentiate the following statuses: no speed constraint applied (FIG. 6A), speed constraint applied and no compliance status information yet determined by the FMS 20 (FIG. 6B), speed constraint applied and the aircraft 8 is on target with respect to complying with the defined speed constraint (FIG. 6C) and speed constraint applied and the aircraft 8 is off target with respect to following the defined speed constraint (FIG. 6D). In FIGS. 6B to 6D, the icon 226 may include a constraint/condition detail indicator annunciating the target speed value of the speed constraint and also whether the speed constraint is a less than, greater than, at or between value. Such a constraint/condition detail indicator may be provided in place of the directionality of the arrow and the target speed value being located therein. Not only could an off target or on target message be provided in a condition/constraint status first detail indicator but also a quantification of the off target status (e.g. in speed units of how far off target the aircraft 8 is predicted to be according to data provided by the FMS 20) in a condition/constraint status second detail indicator.

Figure 7A:
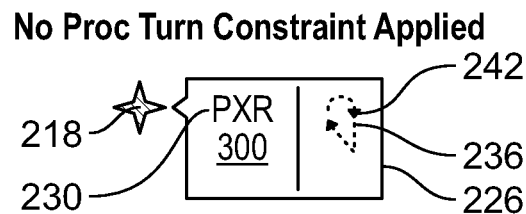
FIGS. 7A to 7D depict icons providing information concerning a constraint or condition associated with a waypoint/fix, in accordance with an embodiment of the present disclosure.
Figure 7B:
Figure 7C:
Figure 7D:

In the exemplary embodiment of FIGS. 7A to 7D, the icon 226 is depicted in the case of a procedural turn condition. In FIG. 7A, a procedural turn has been at least partly input (e.g. by manual entry of waypoints about the procedural turn or by loading a preprogrammed procedural turn) but not yet applied to the FMS 20. The icon 226 includes the constraint/condition type indicator 236 including a symbol representing a procedural turn. In the example provided, the symbol is a tear shaped loop having arrows in a direction (e.g. clockwise or anticlockwise) of the procedural turn. The constraint/condition type indicator 236 is color coded in the form of a color coded status indicator 242 so as to differentiate the following statuses: no procedural turn condition applied (FIG. 7A), procedural turn condition applied and no compliance status information yet determined by the FMS 20 (FIG. 7B), procedural turn condition applied and the aircraft 8 is on target with respect to complying with the defined procedural turn (FIG. 7C) and hold constraint applied and the aircraft 8 is off target with respect to following the defined procedural turn (FIG. 7D). Not only could an off target or on target message be provided in a condition/constraint status first detail indicator but also a quantification of the off target status (e.g. in units of distance determined by the FMS 20 comparing the aircraft position and the defined procedural turn) in a condition/constraint status second detail indicator.

Figure 8:
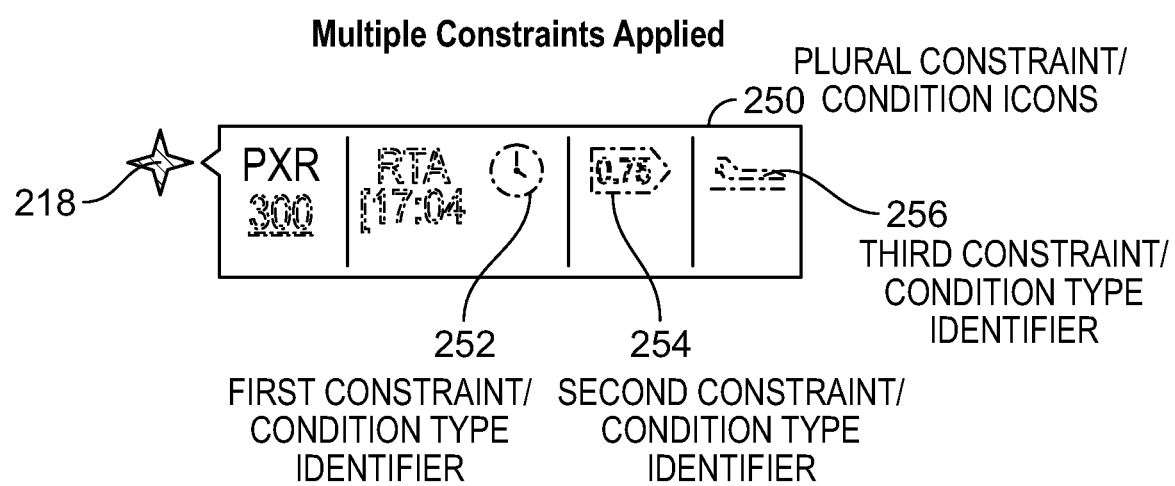
FIG. 8 depicts a plurality of icons tagged to a waypoint/fix when a plurality of constraints or conditions have been set, in accordance with an embodiment of the present disclosure.

In the embodiment of FIG. 8, multiple different constraints/conditions have been applied to one waypoint/fix indicated by the lateral waypoint/fix indicator 218. As each constraint/condition is added, a new icon is added to the plurality of constraint/condition icons 250. The icons 250 are concatenated to each other to form a single block including a series of icons 250 extending horizontally (or vertically in alternative embodiments), with each icon optionally being divided from an adjacent icon by a graphical vertical wall. Each icon of the plurality of icons 250 link to a different constraint/condition specific dialog box 228. In the exemplary embodiment, the plurality of icons is generated based, respectively, on an applied RTA constraint, an applied speed constraint and an applied altitude constraint. It should be appreciated that less or more constraints could be applied to the waypoint/fix, which would result in less or more corresponding icons. Further, different constraint/conditions could be applied as compared to the illustrated example. Each of the plurality icons 250 respectively includes a constraint/condition type identifier. The first constraint/condition type identifier 252 includes a clock symbol to identify the RTA type constraint. The second constraint/condition type identifier 254 includes an arrow symbol to indicate the speed type constraint. The third constraint/condition type identifier includes an aircraft symbol to identify an altitude type constraint. As has been described heretofore, other symbols for identifying each different constraint type could be used. For the altitude type constraint, the third constraint/condition type identifier includes an underline, an overline or both to differentiate whether the altitude constraint is a below, above or at type altitude constraint. The icon for the altitude constraint may include an altitude value of the altitude constraint and may include status information such as an on target or off target message based on a prediction from the FMS 20 and a quantification of how off target the aircraft is predicted to be.

Figure 9:
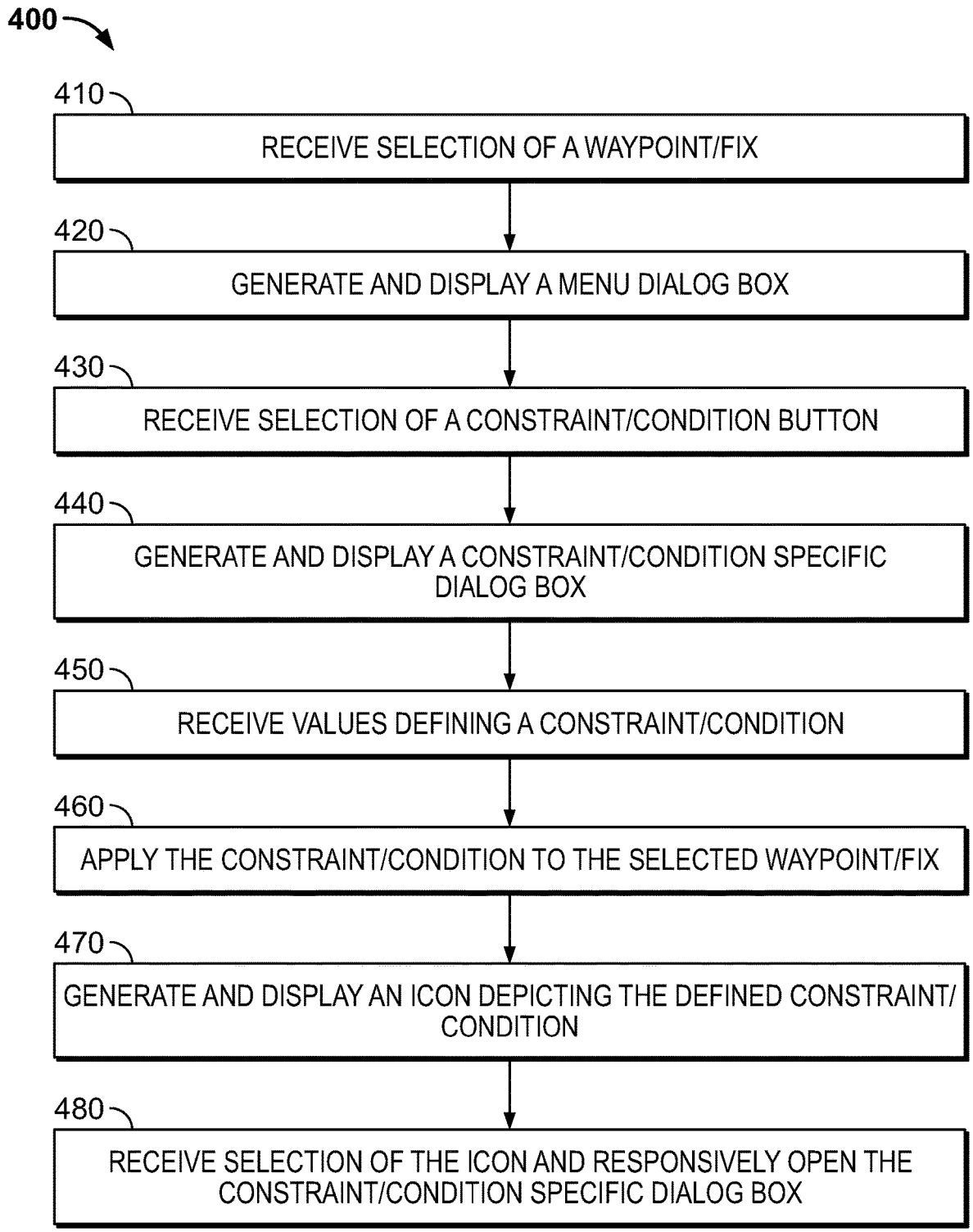
FIG. 9 depicts a flowchart of a method for setting and editing constraints or conditions for a waypoint/fix and generation of an associated graphical user interface, in accordance with an embodiment of the present disclosure.

FIG. 9 depicts a flow chart of a method 400, in accordance with the present disclosure. The method is performed through the processing system 12, specifically the dialog box module 36, the map display module 38, the icon module 40 and the FMS interface module 42 thereof being executed by the processor 30. Method 400 will be described with reference to FIGS. 2A to 2F. The method 400 begins assuming that the graphical user interface 201 is generated and displayed including a lateral or vertical flight plan indication 208, 214 including a plurality of waypoints/fixes labelled with lateral or vertical waypoint/fix indicators 218, 220 and associated waypoint/fix identifiers 230.

In step 410, a waypoint/fix is selected by a user through the user input device 24. In response, the menu dialog box 224 is generated and displayed in step 420 presenting a plurality of buttons embodying actions that can be performed with respect to the selected waypoint/fix. In step 430, a selection of one of the constraint/conditions selector buttons is received such as the RTA selector button 290, the holding pattern selector button 292, the cross selector button 294, etc. In response, the constraint/condition specific dialog box 228 is generated and displayed in step 440. The constraint/condition specific dialog box 228 includes at least one edit selector button 274, 275 to allow a user to set a new constraint/condition for the selected waypoint/fix or to edit an existing constraint/condition of the selected waypoint/fix. In step 450, the edit/set dialog box 260 is opened in response to the user selection in step 440 and values defining a constraint/condition are edited or set. The constraint/condition definition can include entry of speed, position (e.g. altitude) and/or time values and optionally also whether the requirement is less than, greater than, at, before, after or between. In step 460, the user selects to apply the constraint/condition defined in step 440, which is consequently submitted to the FMS 20 for execution using a flight deck application 16 for controlling flight of the aircraft 8.

In step 470, the icon 226 is generated and displayed and tagged to the waypoint/fix identifier 230. The icon 226 identifies the existence of the condition/constraint, the type of the constraint/condition through the constraint/condition type indicator 236 including differentiating symbology and provides details concerning the defined constraint/condition through the constraint/condition detail indicator 234. The details can include an abbreviation of the defined values from step 450 such as a numerical representation of time, speed and/or position and the type of target value such as less than, greater than, at, before, after or between. Further, the icon 226 can receive data from the FMS 20 or other flight data source and provide a status message denoting whether the constraint/condition is on target or off target to being achieved and optionally also a quantification of how far off target the aircraft 8 is predicted to be at the selected waypoint/fix. In step 480, icon 226 can be selected to provide a shortcut to the constraint/condition specific dialog box 228 providing more detailed information on the defined constraint/condition and the performance of the aircraft 8 relative to the constraint/condition and including at least one edit button 274, 275 for commencing a process to redefine the constraint/condition.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed upon the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. For example, the solution can be further broadened to non-weather information (e.g. airspaces). It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft display system for an aircraft, comprising:
a display device;
a processor in operable communication with the display device, the processor configured to execute program instructions, wherein the program instructions are configured to cause the processor to:
   receive flight data from a Flight Management System (FMS) or other flight data source;
   generate, based on the flight data, a map display including a depiction of a flight path and a plurality of waypoints or other fixes;
   receive, via a user interface device, a user selection of one of the waypoints or other fixes;
   generate an edit dialog box;
   receive at least one value for a constraint or condition for the selected one of the waypoints or fixes that is entered in the edit dialog box display by the user via the user interface device;
   apply the at least one value for the constraint or condition to the selected one of the waypoints or fixes via the FMS or other flight data source;
   generate the map display including the depiction of the flight path and the plurality of waypoints or fixes and an icon tagged to the selected one of the waypoints or fixes, wherein the icon denotes an existence of the constraint or condition and a type of the constraint or condition; and
   in response to the user selecting the icon using the user interface device, generate a constraint or condition dialog box providing further information on the constraint or condition;
   wherein the icon denotes the existence of the constraint or condition, the type of the constraint or condition, a current status of the constraint or condition with respect to whether the constraint or condition is on target to be met, which is derived from information obtained from the FMS or other flight data source, and, if the constraint or condition is off target, a quantification of how far off target.

2. The aircraft display system of claim 1, wherein the program instructions are configured to cause the at least one processor to:
   receive at least one value for each of a plurality of different types of constraints or conditions for the selected one of the waypoints or fixes that is entered in a respective edit dialog box by the user via the user interface device;
   apply the at least one value for each of the constraints or conditions to the selected one of the waypoints or fixes via the FMS or other flight data source;
   generate the map display including the depiction of the flight path and the plurality of waypoints or fixes and a plurality of icons tagged to the selected one of the waypoints or fixes, wherein the icons each denote an existence of the constraint or condition and a respective one of the plurality of different types of the constraint or condition; and
   in response to the user selecting one of the plurality of icons using the user interface device, generate the constraint or condition dialog box providing further information on the constraint or condition associated with the selected one of the plurality of icons.

3. The aircraft display system of claim 1, wherein the constraint is a Requested Time of Arrival (RTA) constraint, a holding pattern condition, a procedure turn condition, an altitude constraint, a crossing constraint or a speed constraint.

4. The aircraft display system of claim 1, wherein the program instructions are configured to cause the at least one processor to:
   in response to the user selecting the icon using the user interface device, generate the constraint or condition dialog box providing further information on the constraint or condition;
   receive an edit for at least one value for a constraint or condition in the constraint or condition dialog box by the user via the user interface device; and
   apply the edited at least one value for the constraint or condition to the selected one of the waypoints or fixes via the FMS or other flight data source.

5. The aircraft display system of claim 1, wherein the constraint or condition dialog box includes an edit selector button and wherein the edit dialog box is generated in response to a user selection of the edit selector button via the user interface device.

6. The aircraft display system of claim 1, wherein the edit dialog box and the constraint or condition dialog box is displayed as an overlay on the map display or integrated on a waypoint list.

7. The aircraft display system of claim 1, wherein the current status of the constraint or condition is depicted by color coding.

8. The aircraft display system of claim 1, wherein constraint or condition is a Requested Time of Arrival (RTA) constraint, the icon includes a symbol indicating that the type of constraint is an RTA constraint, alphanumeric text summarizing the RTA constraint when the current status of the RTA constraint indicates that the RTA constraint will be achieved and, when the current status of the RTA constraint indicates that the RTA constraint will not be achieved, alphanumeric text describing whether the aircraft is on target to be early or late and a time quantification of how early or late.

9. A method of generating a display in an aircraft display system for an aircraft, the method comprising:
   receiving, via at least one processor, flight data from a Flight Management System (FMS) or other flight data source;
   generating, via the at least one processor and based on the flight data, a map display including a depiction of a flight path and a plurality of waypoints or other fixes;
   receiving, via the at least one processor and a user interface device, a user selection of one of the waypoints or other fixes;
   generating, via the at least one processor, an edit dialog box;
   receiving, via the at least one processor, at least one value for a constraint or condition for the selected one of the waypoints or fixes that is entered in the edit dialog box display by the user via the user interface device;

applying, via the at least one processor, the at least one value for the constraint or condition to the selected one of the waypoints or fixes via the FMS or other flight data source;

generating, via the at least one processor, the map display including the depiction of the flight path and the plurality of waypoints or fixes and an icon tagged to the selected one of the waypoints or fixes, wherein the icon denotes an existence of the constraint or condition and a type of the constraint or condition; and in response to the user selecting the icon using the user interface device, generating, via the at least one processor, a constraint or condition dialog box providing further information on the constraint or condition;

wherein the icon denotes the existence of the constraint or condition, the type of the constraint or condition, a current status of the constraint or condition with respect to whether the constraint or condition is on target to be met, which is derived from information obtained from the FMS or other flight data source, and, if the constraint or condition is off target, a quantification of how far off target.

10. The method of claim 9, comprising:

receiving, via the at least one processor, at least one value for each of a plurality of different types of constraints or conditions for the selected one of the waypoints or fixes that is entered in a respective edit dialog box by the user via the user interface device;

applying, via the at least one processor, the at least one value for each of the constraints or conditions to the selected one of the waypoints or fixes via the FMS or other flight data source;

generating, via the at least one processor, the map display including the depiction of the flight path and the plurality of waypoints or fixes and a plurality of icons tagged to the selected one of the waypoints or fixes, wherein the icons each denote an existence of the constraint or condition and a respective one of the plurality of different types of the constraint or condition; and in response to the user selecting one of the plurality of icons using the user interface device, generating, via the at least one processor, the constraint or condition dialog box providing further information on the constraint or condition associated with the selected one of the plurality of icons.

11. The method of claim 9, wherein the constraint is a Requested Time of Arrival (RTA) constraint, a holding pattern condition, a procedure turn condition, an altitude constraint, a crossing constraint or a speed constraint.

12. The method of claim 9, comprising:

in response to the user selecting the icon using the user interface device, generating, via the at least one processor, the constraint or condition dialog box providing further information on the constraint or condition;

receiving, via the at least one processor, an edit for at least one value for a constraint or condition in the constraint or condition dialog box by the user via the user interface device; and applying, via the at least one processor, the edited at least one value for the constraint or condition to the selected one of the waypoints or fixes via the FMS or other flight data source.

13. The method of claim 9, wherein the constraint or condition dialog box includes an edit selector button and wherein the edit dialog box is generated in response to a user selection of the edit selector button via the user interface device.

14. The method of claim 9, wherein the edit dialog box and the constraint or condition dialog box is displayed as an overlay on the map display or integrated into a waypoint list.

15. The method of claim 9, wherein the current status of the constraint or condition is depicted by color coding.

16. The method of claim 9, wherein the constraint or condition is a Requested Time of Arrival (RTA) constraint, the icon includes a symbol indicating that the type of constraint is an RTA constraint, alphanumeric text summarizing the RTA constraint when the current status of the RTA constraint indicates that the RTA constraint will be achieved and, when the current status of the RTA constraint indicates that the RTA constraint will not be achieved, alphanumeric text describing whether the aircraft is on target to be early or late and a time quantification of how early or late.

* * * * *